Figure 1:
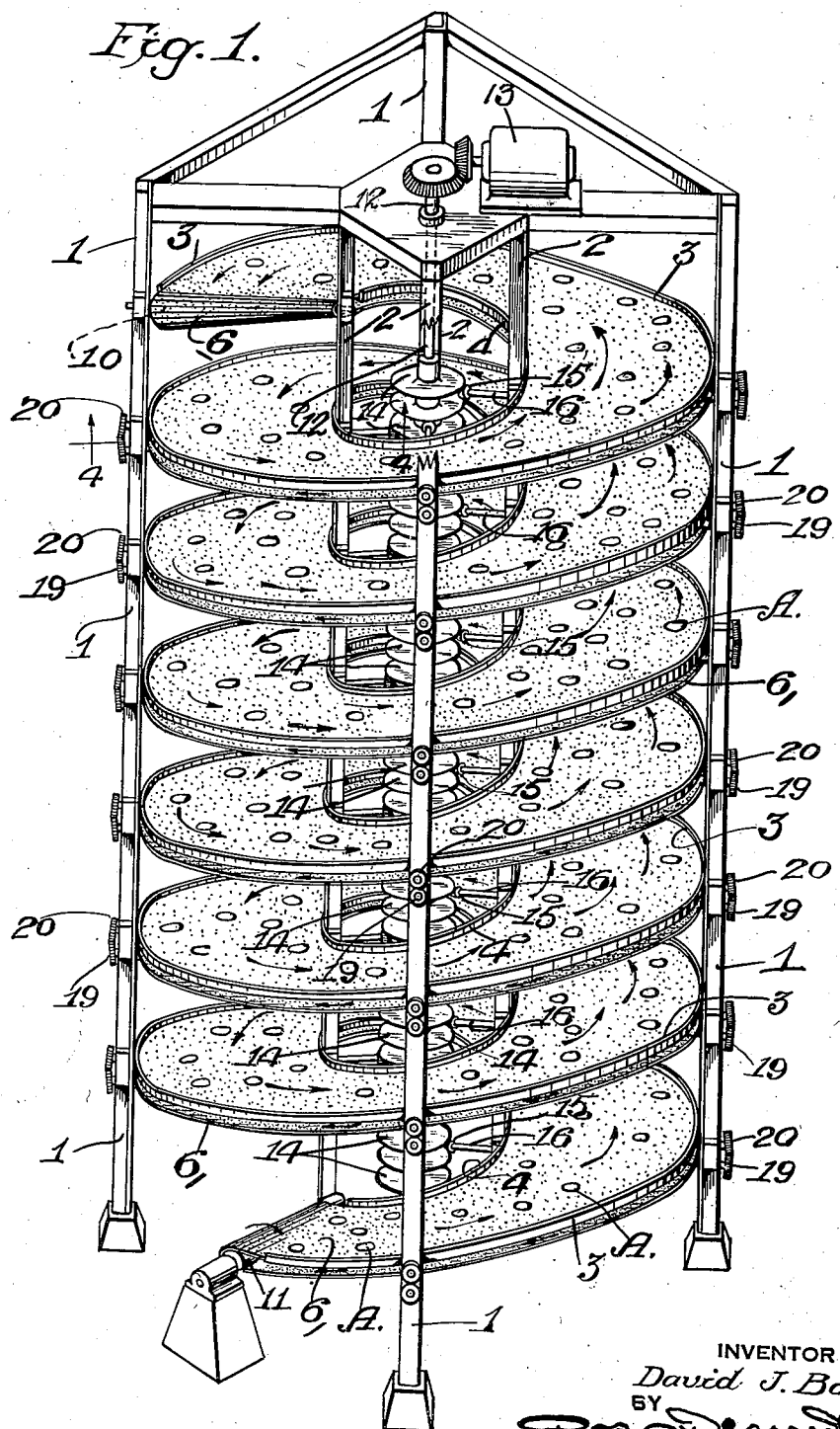

Dec. 30, 1941.                D. J. BOAL                2,267,970
                              CONVEYER
                         Filed April 23, 1938           2 Sheets-Sheet 1

INVENTOR
David J. Boal
BY
ATTORNEY

Dec. 30, 1941.  D. J. BOAL  2,267,970
CONVEYER
Filed April 23, 1938  2 Sheets-Sheet 2
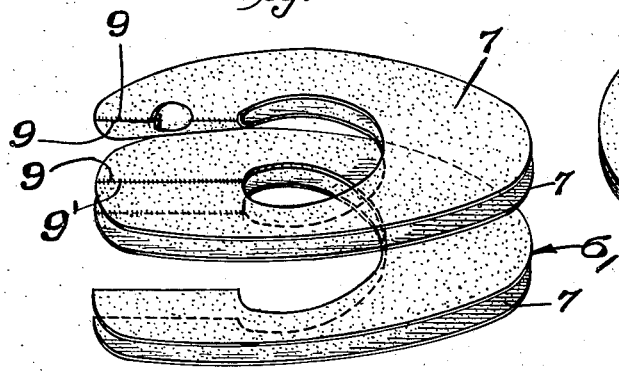
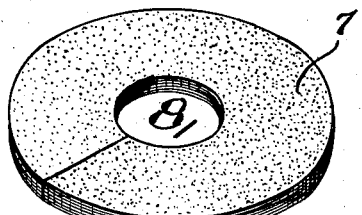
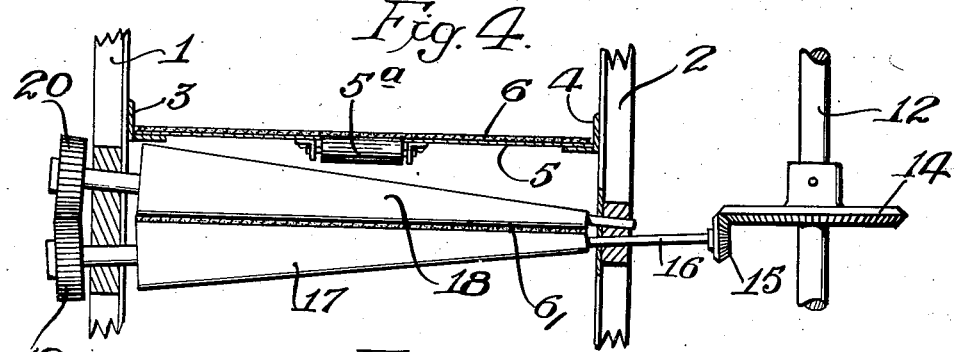
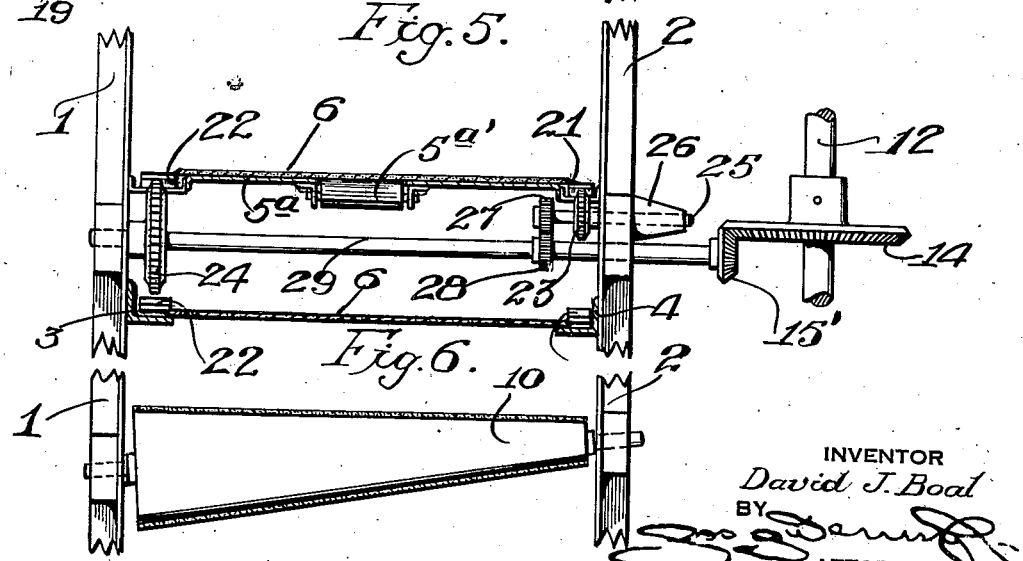
INVENTOR
David J. Boal
BY
ATTORNEY Patented Dec. 30, 1941

2,267,970

UNITED STATES PATENT OFFICE 2,267,970

CONVEYER

David J. Boal, Philadelphia, Pa.

Application April 23, 1938, Serial No. 203,879

4 Claims. (Cl. 198—136)

My invention is a conveyer designed to translate articles along an extended path of travel within a small floor space, and it is especially adapted for the cooling of bakery products discharged from continuous ovens. It is, however, also adapted for elevating and lowering merchandise from one floor or level to another.

In its preferred form, my invention comprises an endless flexible belt having similar superposed helical webs and so driven as to impart movement to the belt without tending to buckle or change the pitch or diameter of the successive turns of either web. The upper web of the belt may be supported upon a stationary spiral plate or thread containing anti-friction rollers and having tapered rollers adjacent to the upper and lower ends of the plate to effect reversal of direction of travel of the webs. The belt is preferably driven along the spiral plate and around the tapered rollers by the engagement of one or both webs by a plurality of driving devices engaging the belt at spaced points along each turn thereof, and preferably arranged quadrantally about the axis of the screw or worm formed by the conveyer. The driving means are preferably driven from a common vertical shaft lying in the axis of the conveyer worm and connected through suitable gearing with radially disposed shafts for rotating the belt driving members at peripheral speeds proportional to the relative lengths of the inner edges and outer edges of the respective turns of the belt and to their respective distances from the axis. The driving means may comprise complementary pairs of web-engaging rolls, each roll being so tapered that the periphery of any cross section thereof is proportional to the radial distance from the conveyer axis of the web section engaged by that particular part of the roller periphery.

The belt may be conveniently and inexpensively formed from radially split discs of textile fabric, preferably woven and impregnated with a suitable binder, such as rubber, and containing a central aperture having a diameter which is preferably one-third the diameter of the disc so that the ratio of peripheral speeds of the peripheries of the rollers at the opposite ends thereof may be in simple proportion.

The belt may be formed by securing together adjacent radial edges of superposed discs, and securing to the opposite radial edges of such discs the radial edges of a succeeding pair of superposed discs and so on until a belt of desired length is formed, and the radial edges of the last pair of discs may be secured to one another to make the belt endless. The belt may, however, be formed of parallel cords or belts each forming a helix. These may be impregnated and secured together with rubber or the like to form webs, the tops and bottoms of the two helical webs being secured to one another.

The characteristic features and advantages of my invention will further appear from the following description and the accompanying drawings in illustration thereof.

In the drawings, Fig. 1 is a perspective elevation of a conveyor embodying my improvements; Fig. 2 is a perspective view, on a small scale, of a stack of split discs from which a conveyer embodying my invention may be assembled; Fig. 3 is a fragmentary detached perspective view of the upper part of a conveyer belt assembled from discs such as shown in Fig. 2; Fig. 4 is an enlarged fragmentary part sectional view taken on the line 4—4 of Fig. 1; Fig. 5 is an enlarged fragmentary part sectional view of a modified form of belt driving mechanism; and Fig. 6 is an enlarged part sectional fragmentary view of a terminal roller shown in Fig. 1 for reversing the direction of travel of the belt.

In the embodiment of my invention illustrated, the uprights 1 and 2 of a skeletal tower have fixed thereto the respective helical flanged rails 3 and 4 on which is mounted the rigid spiral plate 5 (Fig. 4) forming a worm of substantially uniform pitch and providing a support and slideway for the upper web of an endless belt 6 composed of twin spiral webs of flexible fabric. Anti-friction rollers 5a may project through apertures in the plate 5 to diminish the friction between the plate and belt.

Each web is composed of radially split discs 7 having central apertures 8. The leading radial edge 9 of one disc is secured to the trailing radial edge 9' of a preceding disc, until a web of desired length is formed. The radial edges 9 at one end of the webs are secured together and the radial edges 9' at the other end of the webs are secured together to make the belt endless. The loop formed at the upper extremity of the helical belt passes around a freely rotatable roller 10 journalled in the uprights 1 and 2 having a periphery which is tapered outwardly proportionately to the width and curvature of the belt so that the periphery at the inner end of the roller moves at the same rate as the movement of the inner edge of the belt and the periphery of the outer end of the roller moves at the same rate as the movement of the outer edge of the belt. A similar tapered roller 11 is journalled in bearings at the bottom of the tower and passes through the loop formed by the lower extremity of the helix.

A shaft 12 is journalled in bearings in the tower so as to lie in the axis of the helix and is rotatable by a motor 13 or other suitable source of power. Gears 14 fixed on the shaft 12 (Figs. 1 and 4) have teeth which mesh with pinions 15 to drive the belt driving devices. These may consist of shafts 16 journalled in bearings in the uprights 1 and 2 and each having fixed thereon a tapered roller 17 complementary to a tapered roller 18. (Fig. 4). The roller 18 may be an idler but is preferably driven from the shaft 16 through gears 19 and 20. Each pair of rollers 17 and 18 engage between them, and when rotated translate, the lower web of the belt 6. The taper of the rollers 17 and 18 is proportioned to the distance from the axis so that the movement of each peripheral section of the roller is at a rate suitable for translating the adjacent section of the web without changing the pitch or causing the web to buckle. Preferably, at least four pairs of rollers, arranged quadrantally, are provided for each complete turn of the belt so that there is no drag on the lower web through an angle tending to skew the web.

In the modified form shown in Fig. 5, the inner and outer edges of the belt may have fixed thereto sprocket chains 21 and 22 adapted to be engaged by sprocket teeth on the sprocket wheels 23 and 24 to drive the upper web along the spiral plate 5a provided with anti-friction rollers 5a'. The sprocket wheel 23 is fixed on a stub shaft 25 journalled in a bearing 26 on the upright 2 and having a pinion 27 meshing with the pinion 28 on the shaft 29 to which the sprocket 24 is fixed. The shaft 29 may be driven through a beveled gear 15' from a gear 14 fixed on the shaft 12. The size of the sprockets 23 and 24 are so proportioned as to impart to the inner and outer edges of the upper web of the belt 6 such rates of movement as will move the web uniformly and without skewing around the axis of the helix.

In a preferred utilization of my improvements, bakery products A are discharged from a continuous oven onto the lower part of the upper web of the belt and are carried upwardly and cooled during the translation of the upper web of the belt upwardly. Such products may be discharged from the upper extremity of the belt to a second conveyer having a downwardly moving top web, or to any other suitable receptacle. If desired, the tower may be enclosed by a housing to permit control of circulation of refrigerating air or other gases.

Having described my invention, I claim:

1. A conveyer comprising a stationary helical plate repeatedly circling about a substantially vertical axis and forming a worm having spaced superposed runs; an endless belt composed of upper and lower helical webs of flexible fabric repeatedly circling about said axis to form a series of spaced runs, each run of said plate spacing from one another a run of the upper web and a run of the lower web of said belt; and means comprising a plurality of driving devices in each run of one of said webs for engaging said belt and translating it over and under said plate and about the ends thereof.

2. A conveyer as set forth in claim 1, said means for translating said belt comprising a plurality of pairs of tapered nip rollers extending from side to side of the lower web of said belt in each run thereof.

3. A conveyer as set forth in claim 1, the belt having a chain attached to each edge thereof, and the means for translating said belt and comprising a plurality of pairs of relatively proportioned sprockets for each run of one of said webs and engaging the chains on the opposite edges thereof.

4. A conveyer comprising a rotary vertical shaft having a plurality of spaced bevel gears along the length thereof, a stationary plate helically and repeatedly circling about said shaft and forming a plurality of spaced superposed runs, an endless helical belt of flexible fabric mounted on said plate and having an upper web and a lower web with runs complementary to the runs of said plate, and driving means connected with said bevel gears and engaging opposite sides of one of said webs at a plurality of points in each run thereof for translating said belt.

DAVID J. BOAL.